US009947215B2

(12) United States Patent
Di Censo et al.

(10) Patent No.: US 9,947,215 B2
(45) Date of Patent: Apr. 17, 2018

(54) PEDESTRIAN INFORMATION SYSTEM

(71) Applicant: Harman International Industries, Inc., Stamford, CT (US)

(72) Inventors: Davide Di Censo, San Mateo, CA (US); Stefan Marti, Oakland, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 314 days.

(21) Appl. No.: 14/498,525

(22) Filed: Sep. 26, 2014

(65) Prior Publication Data

US 2016/0093207 A1 Mar. 31, 2016

(51) Int. Cl.

*G06K 9/00* (2006.01)
*G08G 1/005* (2006.01)
*H04R 1/10* (2006.01)

(52) U.S. Cl.

CPC ........... *G08G 1/005* (2013.01); *H04R 1/1091* (2013.01); *H04R 1/1008* (2013.01); *H04R 1/1041* (2013.01); *H04R 2460/07* (2013.01)

(58) Field of Classification Search

CPC ........................................................ G08G 1/005
USPC .......................... 340/435, 903, 944; 701/301
See application file for complete search history.

(56) References Cited

U.S. PATENT DOCUMENTS 5,647,011 A 7/1997 Garvis
7,986,791 B2 7/2011 Bostick et al.
8,253,589 B2 * 8/2012 Grimm et al. ................ 340/901
2004/0150514 A1 * 8/2004 Newman ................ B60Q 9/008 340/435
2006/0083387 A1 4/2006 Emoto
2008/0079571 A1 4/2008 Samadani
2009/0046868 A1 2/2009 Engle et al.
2009/0232325 A1 9/2009 Lundquist
2009/0243880 A1 * 10/2009 Kiuchi .................. G08G 1/166 340/903
2011/0133954 A1 * 6/2011 Ooshima .......... G08G 1/096716 340/905
2013/0044005 A1 2/2013 Foshee et al.

(Continued)

FOREIGN PATENT DOCUMENTS

JP 2013056180 A 3/2013

OTHER PUBLICATIONS

Al-Rahayfeh et al., "Eye Tracking and Head Movement Detection: A State-of-Art Survey," IEEE Journal of Translational Engineering in Health and Medicine, Nov. 6, 2013, vol. 1, ISSN 2168-2372, pp. 1-12. (http://ieeexplore.ieee.org/xpl/articleDetails.jsp?arnumber=6656866).

(Continued)

*Primary Examiner* — Brent Swarthout
(74) *Attorney, Agent, or Firm* — Artegis Law Group, LLP

(57) ABSTRACT

A pedestrian information system that can provide alerts to a distracted pedestrian related to hazards in the pedestrian's path. The system can detect objects, and determine if the objects are hazardous and if the pedestrian is likely to collide with the objects. The system can then determine from the pedestrian's activity whether the pedestrian is aware of identified hazards. If the system determines that the pedestrian is not aware of the identified hazards, then the system can output audio, visual, and/or haptic alerts to the pedestrian.

14 Claims, 9 Drawing Sheets

(56) References Cited

U.S. PATENT DOCUMENTS

| | | | | |
|---|---|---|---|---|
| 2013/0242093 | A1 | 9/2013 | Cobb et al. | |
| 2015/0035685 | A1* | 2/2015 | Strickland .............. | B60Q 9/008 340/901 |

OTHER PUBLICATIONS

International Search Report and Written Opinion for PCT/US2015/050038 dated Dec. 23, 2015.

* cited by examiner

PEDESTRIAN INFORMATION SYSTEM

BACKGROUND

Pedestrians are sometimes distracted as they walk. For example, some pedestrians send e-mail, text messages, or the like from their cellular telephones as they walk. Other pedestrians merely may be daydreaming as they walk along. However, if the pedestrians are not paying attention to their surroundings, they risk walking into a hazardous object and/or region. For example, a pedestrian may walk into the street into the path of a car. As another example, the pedestrian may step in a puddle of water or a patch of mud.

SUMMARY

Various embodiments of a system for providing warnings of hazards to a pedestrian can include a first sensor that can detect at least one of regions and/or objects in an environment of the pedestrian. The system can also include a second sensor that can detect an activity of the pedestrian. The first sensor and the second sensor can be worn by the pedestrian. The system can include an acoustic transducer (e.g., a speaker) that can be arranged on, in, or relative to the pedestrian's ear. The system can also include a processor that can be configured to identify at least one of a detected region and object that is a hazard to the pedestrian. The processor can also determine whether the detected activity of the pedestrian is an indication that the pedestrian is aware of the at least one of the detected region and object. Upon determining that the detected activity is not an indication of awareness, the processor can be configured to output to the acoustic transducer an audio warning for the at least one of the detected region and object.

Various embodiments of headphones for providing warnings of hazards to a pedestrian can include a housing and at least one acoustic transducer arranged on the housing and configured to be positioned relative to a pedestrian's ear. The headphones can include a first sensor that can detect at least one of regions and/or objects in an environment of the pedestrian. The headphones can also include a second sensor that can detect an activity of the pedestrian. The headphones can also include a processor that can be configured to identify at least one of a detected region and object that is a hazard to the pedestrian. The processor can also determine whether the detected activity of the pedestrian is an indication that the pedestrian is aware of the at least one of the detected region and object. Upon determining that the detected activity is not an indication of awareness, the processor can be configured to output to the at least one acoustic transducer an audio warning for the at least one of the detected region and object.

Various embodiments of a computer-program product for providing monitoring services can include a non-transitory computer-readable medium that includes computer-readable program code embodied therewith. The program code can be configured to analyze a digital image of an environment of a pedestrian to identify at least one of an object and a region that is a hazard to the pedestrian. The program code can also be configured to analyze received information about an activity of the pedestrian and determine whether the detected activity is an indication that the pedestrian is aware of the at least one of the detected object and region. The program code can also be configured to output to acoustic transducers an audible warning upon determining that the activity is not an indication that the pedestrian is aware of the at least one of the detected object and region.

DETAILED DESCRIPTION

Embodiments of the present disclosure include a digital assistant system which may include at least one sensor, an output module, and control logic. The sensor(s) can detect one or more aspects of a user's environment, such as spoken words, sounds, images of the user's surrounding, and/or actions of the user. The control logic, which can be included in a processing module, for example, can identify a context of the user's activities and/or environment from the aspect(s) detected by the sensor(s). Then, the system can proactively retrieve additional and/or supplemental information that is relevant to the identified context of the user's activities and/or environment and proactively present the retrieved information to the user.

Figure 1A:
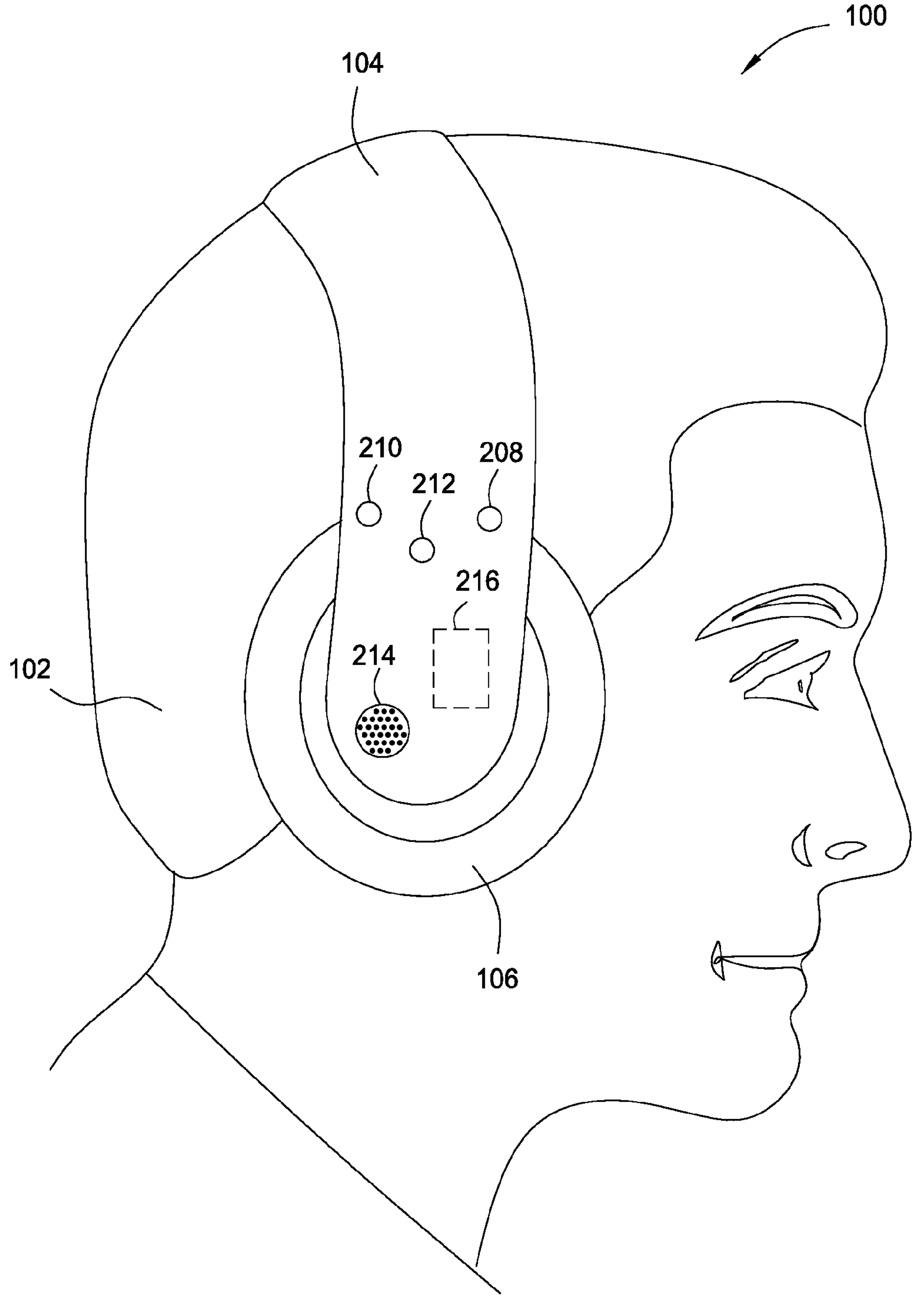
FIG. 1A is a perspective view of a pedestrian wearing an embodiment of headphones.

FIG. 1 illustrates an embodiment of a pedestrian guardian angel arranged in headphones 100. FIGS. 2A-2D illustrate various components that can be arranged in and/or on the headphones 100. The headphones 100 can include a housing 104 and acoustic transducers 106 (e.g., speakers). In various embodiments, the acoustic transducers 106 can include over-the-ear (supra-aural) or around-the-ear (circum-aural) headphones, and the housing 104 can include a headband that supports the acoustic transducers 106 and fits over a pedestrian's head. In various embodiments, the acoustic transducers 106 can include in-the-ear acoustic transducers (e.g., ear buds), and the housing 104 can include a separate unit connected to the acoustic transducers 106 via speaker cables or a wireless connection (e.g., Bluetooth®).

The housing 104 can include a processor module 216 and a variety of sensors that can detect a pedestrian's environment and aspects of the pedestrian's behavior that may indicate whether the pedestrian is paying attention to his surroundings and any hazards. For example, the housing 104 can include one or more outward-facing cameras 220 that capture digital images of the wearer's surroundings. In the embodiment shown in FIG. 1A, the housing 104 includes three cameras 208, 210, and 212 that can capture digital images in front of, in back of, and to the side of the pedestrian. A second side of the housing (not shown in FIG. 1A) can include additional cameras to capture images on the other side of the pedestrian. The cameras can include one or more of visible light sensors, infrared light sensors, ultra-violet light sensors, thermal sensors, etc.

The housing 104 can also include an external microphone 222 that can capture sounds from the pedestrian's environment. In the embodiment shown in FIG. 1A, the housing 104 can include a first microphone 214 and a second microphone on an opposite side of the housing 104. By providing two or more microphones 222, the processor module 202 may be able to analyze a sound detected by both microphones and provide a relative bearing to the source of the sound.

The housing 104 can include additional sensors that detect aspects of the pedestrian's environment. For example, the housing 104 can include a global positioning system (GPS) module 224 that can detect the location of the pedestrian. GPS as noted herein generally refers to any and/or all global navigation satellite systems, which include GPS, GLONASS, Galileo, BeiDou, etc. The GPS module can also calculate the pedestrian's direction of travel and speed of travel. The housing 104 can also include other sensors, such as air sniffers to detect chemicals in the air, laser-distance measuring sensors, and ultrasonic sensors, for example.

Figure 1B:
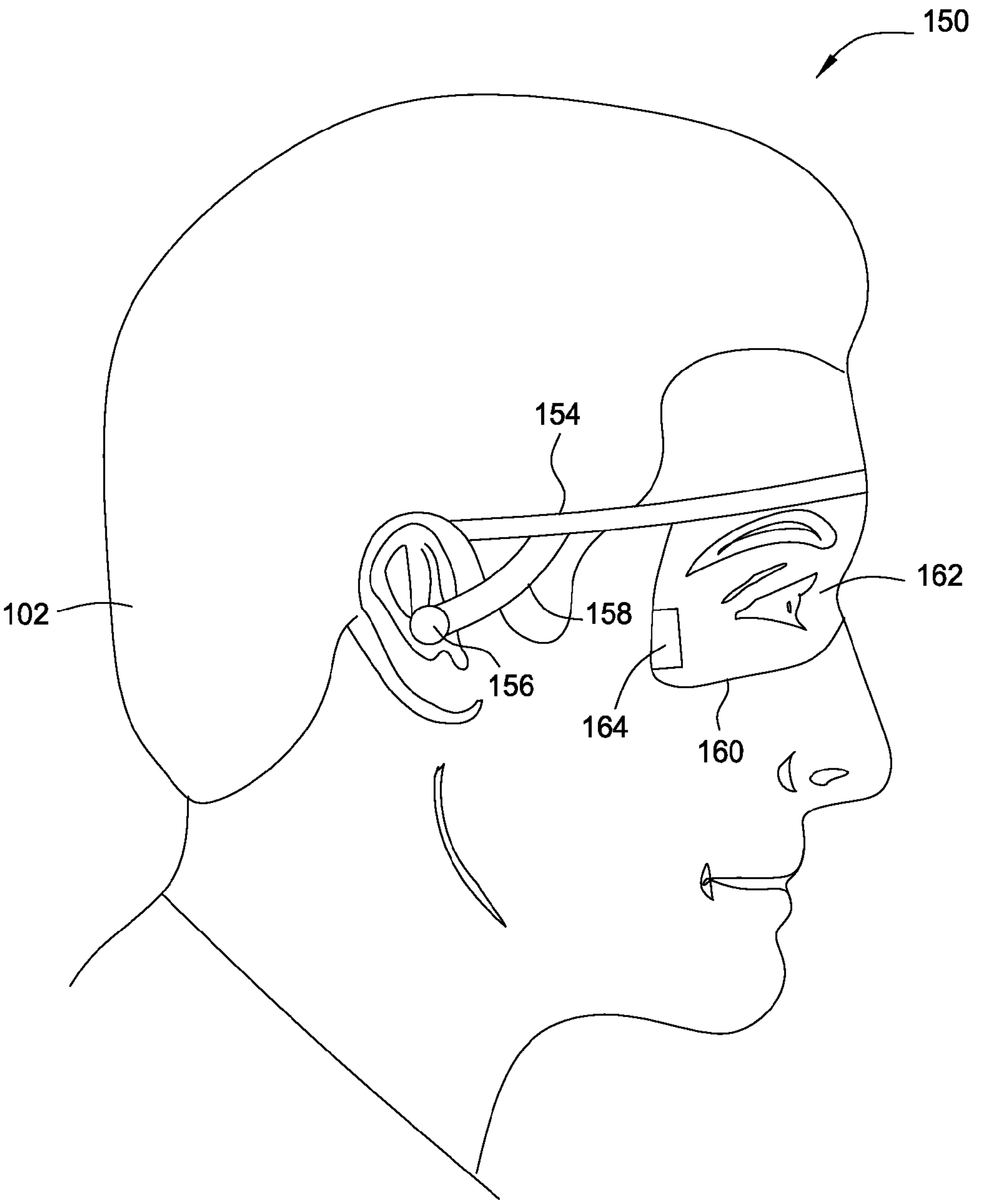
FIG. 1B is a perspective view of a pedestrian wearing an embodiment of smart glasses and headphones.
Figure 2A:
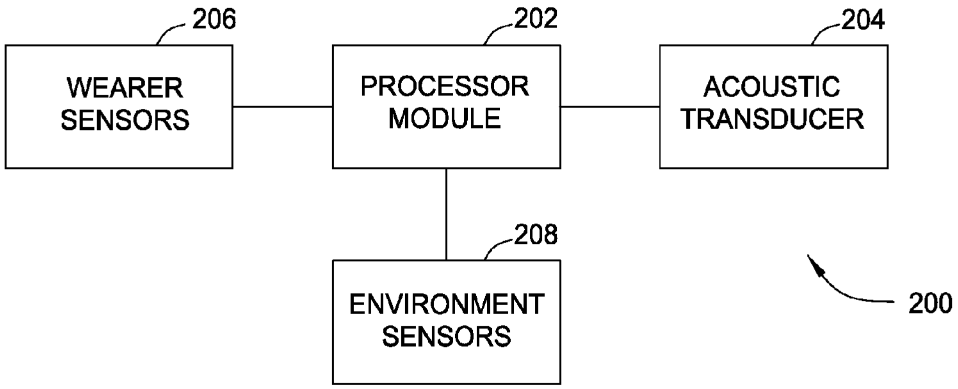
FIG. 2A is a block diagram of system components of embodiments described herein.
Figure 2B:
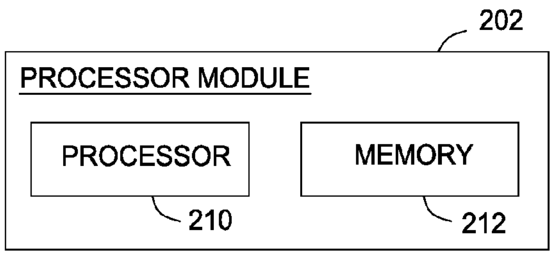
FIG. 2B is a detailed block diagram of an embodiment of a processor module.
Figure 2C:
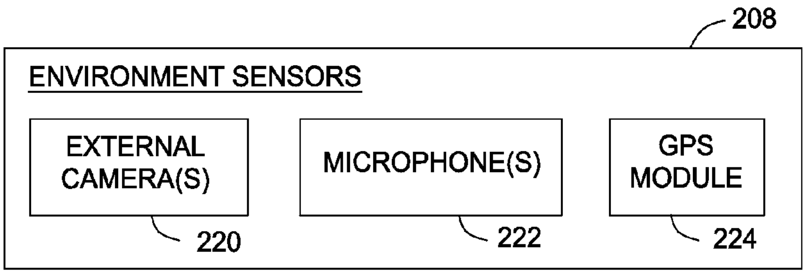
FIG. 2C is a detailed block diagram of an embodiment of environmental sensors.
Figure 2D:
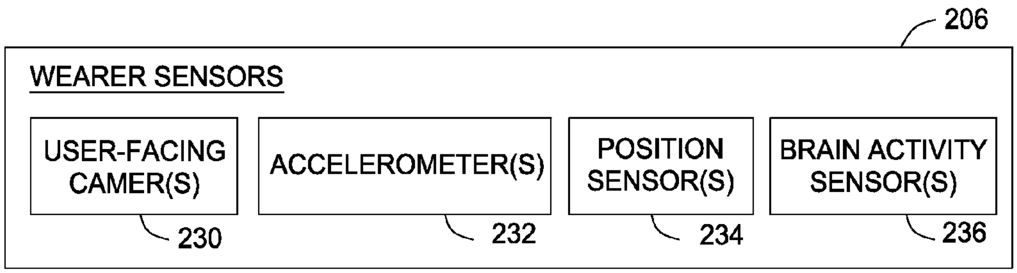
FIG. 2D is a detailed block diagram of embodiments of pedestrian sensors.

The housing 104 can also include sensors that detect aspects of the pedestrian's activity and/or behavior. For example, as illustrated in FIG. 1B, various embodiments can include a pedestrian-facing camera 230. In FIG. 1B, the pedestrian-facing camera(s) 164 can be mounted to a lens 160 or frame 154 of eyewear 150 to view the eye(s) 162 of the pedestrian. The pedestrian-facing camera 164 can detect a direction of eye gaze of the pedestrian. The housing 104 can also include sensors (e.g., accelerometers 232 and position sensors 234) that can detect movement and positions of the pedestrian's head (e.g., which way the pedestrian has turned his head and the direction in which his head is facing). The housing 104 can also include brain activity sensors 236 that can detect brain waves and/or locations of the pedestrian's brain that are stimulated. Examples of brain activity sensors 236 can include the Emotiv® EPOC® neuroheadset, NeuroSky® biosensors, and Freer Logic Bodywave® sensors.

Referring still to FIG. 1B, embodiments of eyewear 150 can include acoustic transducers 156 arranged relative to the ears on a pedestrian's head 102. For example, the acoustic transducers 156 can be mounted on stalks 158 that extend from an eyewear frame 154.

With reference now to FIGS. 2A-2D, in various embodiments of a system 200, the various pedestrian sensors 206 and environment sensors 208 can be in communication with a processor module 202 to detect hazardous objects and/or regions in the pedestrian's environment and to determine whether the pedestrian is aware of the detected hazardous objects and/or regions. For example, the pedestrian may be distracted by his smart phone or the like and not paying attention to where he is walking. In instances when the processor module 202 detects one or more hazardous objects and/or regions (based on inputs from the environment sensors 208) and determines that the pedestrian is not aware of the hazard (based on the environment sensors and/or the pedestrian sensors), the processor module 202 can output an audible warning through the acoustic transducers 204. In various embodiments, the processor module 202 adjusts the audible warning transmitted to different acoustic transducers

204 (e.g., an acoustic transducer in the pedestrian's left ear and an acoustic transducer in the pedestrian's right ear) to provide an audible warning that the pedestrian perceives as originating from the direction of the detected hazard. In various embodiments, the system can also include haptic feedback modules, such as vibrating motors, to provide a vibrating warning of a hazard to the pedestrian.

In various embodiments, the various components of the system 200 can be split amongst multiple physical pieces of hardware. For example, the processor module 202 can be provided in a smart phone. For example, the smart phone may include an application that performs the processes and/or algorithms described herein. Various environmental sensors 208 can be included in the smart phone (e.g., an external camera and an eye tracking camera, a GPS receiver, etc.). The acoustic transducers 204 can be incorporated in earbuds or headphones that are connected to the smartphone via speaker wire or a wireless connection. The wearer sensors can be incorporated in the smart phone, in a housing that includes the acoustic transducers, or a separate housing (e.g., a housing in jewelry, clothing, or the like).

In various embodiments, the processor module 202 can include a computer processor 210 and memory 212. The processor 210 can execute algorithms stored in memory 212. The processor 210 can also analyze received sensor data (from the pedestrian sensors 206 and environment sensors 208) to detect and/or identify hazards and determine if the pedestrian is aware of the detected hazards. The processor 210 can also output audible warnings to the acoustic transducers 204. For example, the processor 210 can perform text-to-speech conversions to provide a descriptive warning of a hazard so the pedestrian knows what to look for. Also, as described above, the processor 210 can provide different outputs to different acoustic transducers to provide an audible stereo warning that is perceived by the pedestrian as originating from the location of the hazard.

The memory 212 can include various algorithms executed by the processor 210. The memory 212 can also include an object recognition database and/or a geo-referenced hazard map. An object recognition database can include images of known hazardous objects, such as vehicles, municipal trash cans on sidewalks, curbs, etc. The object recognition database can also include images of known objects that are not hazards. The processor 210 can compare received images to the object recognition database to identify objects in the environment that may be hazards. The geo-referenced hazard map can include locations of known, fixed-in-place hazards, such as light poles or street signs in sidewalks.

As used herein, the term "hazards" can include objects and/or regions in a pedestrian's environment that could hurt the pedestrian if the pedestrian were to collide with them (e.g., cars, bicycles, other pedestrians, trash cans, etc.). "Hazards" can also include objects and/or regions in the pedestrian's environment that the pedestrian would object to coming into contact with (e.g., large puddles, muddy areas, dog waste on a sidewalk, etc.). In various instances, the system 200 may employ machine learning or the like to determine what the pedestrian finds objectionable. For example, if the pedestrian consistently walks around puddles, then the system 200 can determine that the pedestrian finds puddles to be objectionable. In various embodiments, the system 200 can access a database of stored objectionable objects and/or regions that have been gathered by multiple pedestrians (e.g., crowd sourced). For example, in various embodiments, the system 200 can download and store the database locally. In various embodiments, the system 200 can access the database on a remote computer system by communicating with the remote computer system with a data transceiver (e.g., a Wi-Fi or cellular data connection).

Figure 3A:
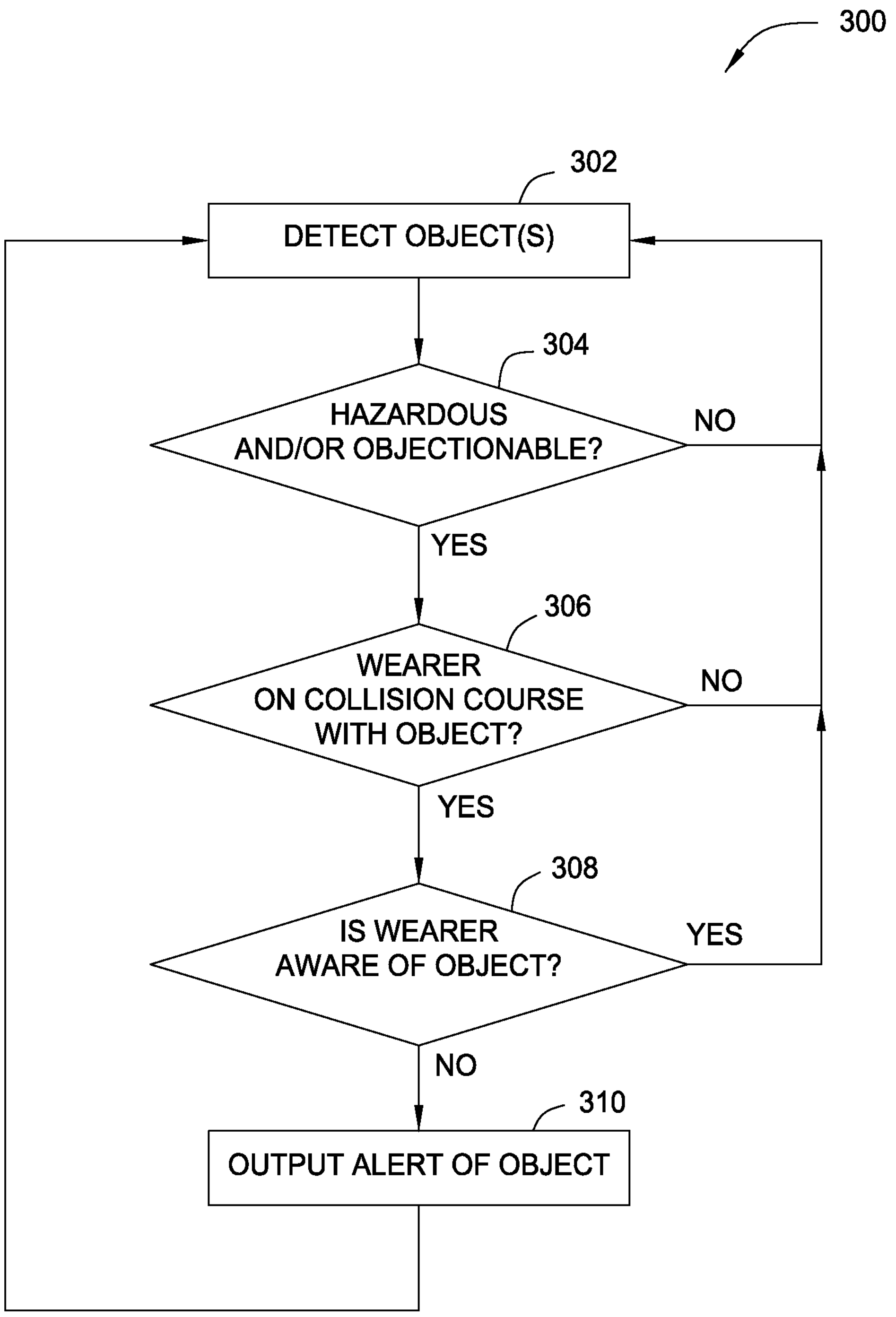
FIG. 3A is a flow chart for a process implemented by various embodiments.

FIG. 3A illustrates an embodiment of a process 300 that can be implemented by the processor 210 to provide warnings to a pedestrian. In block 302, the processor module 210 can receive one or more images from the external cameras 220 and identify objects and/or regions in the received images. In addition, the processor 210 can determine the location of the pedestrian (e.g., using the GPS module 224) and identify hazards stored in the geo-referenced hazard map database.

In block 304, the processor can determine whether a detected object and/or region is a hazard. If the pedestrian is approaching a known hazard stored in the geo-referenced hazard map database, then the detected object and/or region is a hazard. For objects and/or regions detected in images received from the external camera(s) 220, the processor 210 can analyze the detected object and/or region to determine whether the object and/or region is a hazard. For example, the processor 210 can compare the detected object and/or region to the object recognition database to see if the detected object and/or region matches an image of a known hazardous object and/or region. The processor 210 can also analyze the detected object to determine its size. A small object, such as a chewing gum wrapper on the sidewalk, may not be a hazard. By contrast, a large object, such as a municipal trash can, may be a hazard. The processor 210 can also analyze the detected object's and/or region's infrared and/or ultraviolet signature. For example, a puddle of water on the sidewalk may have a different infrared signature than the dry sidewalk surrounding the puddle or from portions of the sidewalk that are merely wet. Similarly, the processor 210 can analyze the reflectivity of the detected object. In the example above, the puddle may have a different reflectivity than dry pavement or merely wet pavement.

In block 304, if the processor 210 determines that an analyzed object and/or region is not a hazard, then the process 300 can return to block 302 to detect additional objects and/or regions as the pedestrian moves. If the processor 210 determines that the analyzed object and/or region is a hazard, then the process 300 can move to block 306 to determine whether the pedestrian is on a collision course with the object and/or region. In block 306, the processor 306 can analyze data from the various sensors to determine whether the pedestrian is on a collision course with the detected hazardous object and/or region. For example, the processor 210 can calculate a trajectory of the pedestrian (e.g., speed and direction of travel) and/or a trajectory of the object if the object is moving (e.g., a car driving along a road). In various embodiments, the processor 210 can calculate a relative trajectory between the pedestrian and the detected hazardous object and/or region. For example, in various embodiments, the processor 210 can analyze successive digital images received from the external camera(s) 220 to calculate a relative trajectory of the detected hazardous object and/or region relative to the pedestrian. For example, if a digital image of the detected hazardous object and/or region is getting larger in successive digital images, then the object is getting closer. Also, if the digital image of the detected hazardous object and/or region is approximately stationary in successive digital images, then the detected hazardous object and/or region may be moving directly toward the pedestrian. By contrast, if the detected hazardous object and/or region is getting smaller in successive digital images and/or the object and/or region is not approximately stationary in successive digital images, then the object and/or region may be moving away from the pedestrian or moving along a relative trajectory that will not result in a collision with the pedestrian. The processor 210 can also receive other sensor data that can be used to determine whether a relative trajectory between the detected hazardous object and/or region and the pedestrian is likely to result in a collision. For example, as discussed above, a system 200 can include laser-distance measuring sensors, motion detectors, and/or ultrasonic sensors. The processor 210 can use data received from these sensors to calculate a range and/or relative direction of travel of the detected object and/or region. In block 306, if the processor 210 determines that the pedestrian and/or the detected hazardous object and/or region are not on a collision course, then the process 300 can return to block 302.

In block 306, if the processor 210 determines that the pedestrian and/or the detected hazardous object and/or region are on a collision course, then the process 300 can proceed to block 308, wherein the processor 210 determines whether the pedestrian is aware of the detected hazardous object and/or region. For example, the processor 210 can analyze received data from various sensors to detect activity of the pedestrian and determine whether the detected activity indicates that the pedestrian is aware of the detected hazardous object and/or region. For example, in various embodiments, the processor 210 may receive data from an application running on a smart phone that indicates that the pedestrian is interacting with the application (e.g., a user activity). The processor 210 can determine that if the pedestrian is interacting with the application, then the pedestrian is not paying attention to his surroundings and is therefore not aware of detected hazardous objects and/or regions. As another example, if the processor 210 receives data from accelerometers (discussed above) that the pedestrian has turned his head to look in both directions as he approaches a street, then the processor 210 may determine that the pedestrian is looking around and that looking around is an indication that the pedestrian may be aware of detected hazardous objects and/or region, such as the street. As another example, a user-facing camera 230 can determine whether the pedestrian is looking elsewhere (and therefore not looking at where he is going). For example, a camera built into a smart phone may detect the pedestrian's eye gaze and send eye gaze information to the processor 210. If the pedestrian does not look away from the screen of the smart phone for several seconds, then the processor 210 may determine that the pedestrian is distracted by content on the smart phone screen and may not be aware of a hazardous object and/or region. As another example, if the processor 210 receives data from the GPS module 224 that the pedestrian has changed his pace (e.g., slows down as he approaches a street), then the processor 210 may determine that slowing pace is an indication that the pedestrian is aware of the street (i.e., a detected hazardous region). As another example, the processor 210 can receive data from the brain activity sensor(s) 236. In various embodiments, the brain activity sensor(s) 236 may detect brain activity in regions of the pedestrian's brain that are active when the pedestrian is aware of a hazard (i.e., hazard regions of the brain). In such embodiments, if the processor 210 determines that the hazard regions of the pedestrian's brain are active, then the processor 210 may determine that certain brain activity is an indication that the pedestrian is aware of a detected hazardous object and/or region. In various embodiments, the brain activity sensor(s) 236 may detect brain activity in regions of the pedestrian's brain that are active when the pedestrian is engaged in certain distracting activities (e.g., reading e-mail, listening to music, and talking on the phone). For example, embodiments of the system 200 may employ machine learning to identify regions of the pedestrian's brain that are active during different types of activities. In the event the system 200 determines that regions of the pedestrian's brain that are active during distracting activities are active, then the processor 210 may determine that the detected activity indicates that the pedestrian is distracted and likely unaware of a detected hazardous object and/or hazard. In various other embodiments, the brain activity sensor(s) 236 can detect brain signals that indicate awareness of danger. In such embodiments, if the processor 210 detects the brain signals, then the processor 210 may determine that the brain activity is an indication that the pedestrian is aware of the danger. If the processor 210 determines that the pedestrian is aware of the detected hazardous object and/or region, then, in block 308, the processor 210 can return to block 302. In another embodiment, the brain activity signal(s) 236 can detect brain signals that indicate that the pedestrian is engaged in an activity that may distract him from recognizing a hazardous object and/or region in his path. For example, in various embodiments, the system 200 can employ machine learning to identify brain activity signal patterns when the pedestrian is engaged in certain distracting activities (e.g., talking on the phone, typing an e-mail or text message, and watching a video on his smart phone). If the system 200 detects identified brain activity signal patterns, then the system 200 can determine that the signal patterns are an indication that the pedestrian is engaged in an activity that may distract him from seeing a hazardous object and/or region.

If the processor 210 determines that the pedestrian is not aware of the detected hazardous object and/or region, then the processor 210 can move to block 310 of the process and output an alert to the pedestrian. The alert can include an audible alert played through the acoustic transducer(s) 204. The alert can include a spoken-language warning that describes the hazard (e.g., "a car is approaching from your left"). As discussed above, in embodiments that include two acoustic transducers 204, the alert can include a stereo or binaural output that is perceived by the pedestrian as originating at the same location as the detected hazard and/or region. In various embodiments in which the system 200 operates on a pedestrian's smart phone, the alert can include a visual alert on a display screen of the smart phone. The visual alert can include an image of the detected hazardous object and/or region as well as a textual alert. In various embodiments, the system 200 can communicate with a head-mounted display device or other computerized eyewear, such as Google Glass®, and the visual alert can be displayed on an eyepiece in the pedestrian's field of view. In various embodiments, the alert can include a haptic alert to the pedestrian. For example, the system 200 can be in communication with one or more vibration motors (e.g., a vibrating motor in the pedestrian's smart phone or vibrating motors being worn by the pedestrian). In such embodiments, the alert can include operation of the vibrating motors. In embodiments in which the pedestrian may be wearing multiple vibrating motors, the motor(s) closest to the detected hazardous object and/or region can be operated to provide an indication of direction to the hazard to the pedestrian. After the alert has been output, the process 300 can return to block 302. If the pedestrian has recognized the warning and detected the hazard (as discussed above in reference to block 308), then the processor 210 will not re-issue the alert (at block 310). However, if the pedestrian has ignored the alert and/or the pedestrian's activity indicates that he is not aware of the hazard, then the processor 210 can repeat the warning when step 310 is reached again.

Figure 3B:
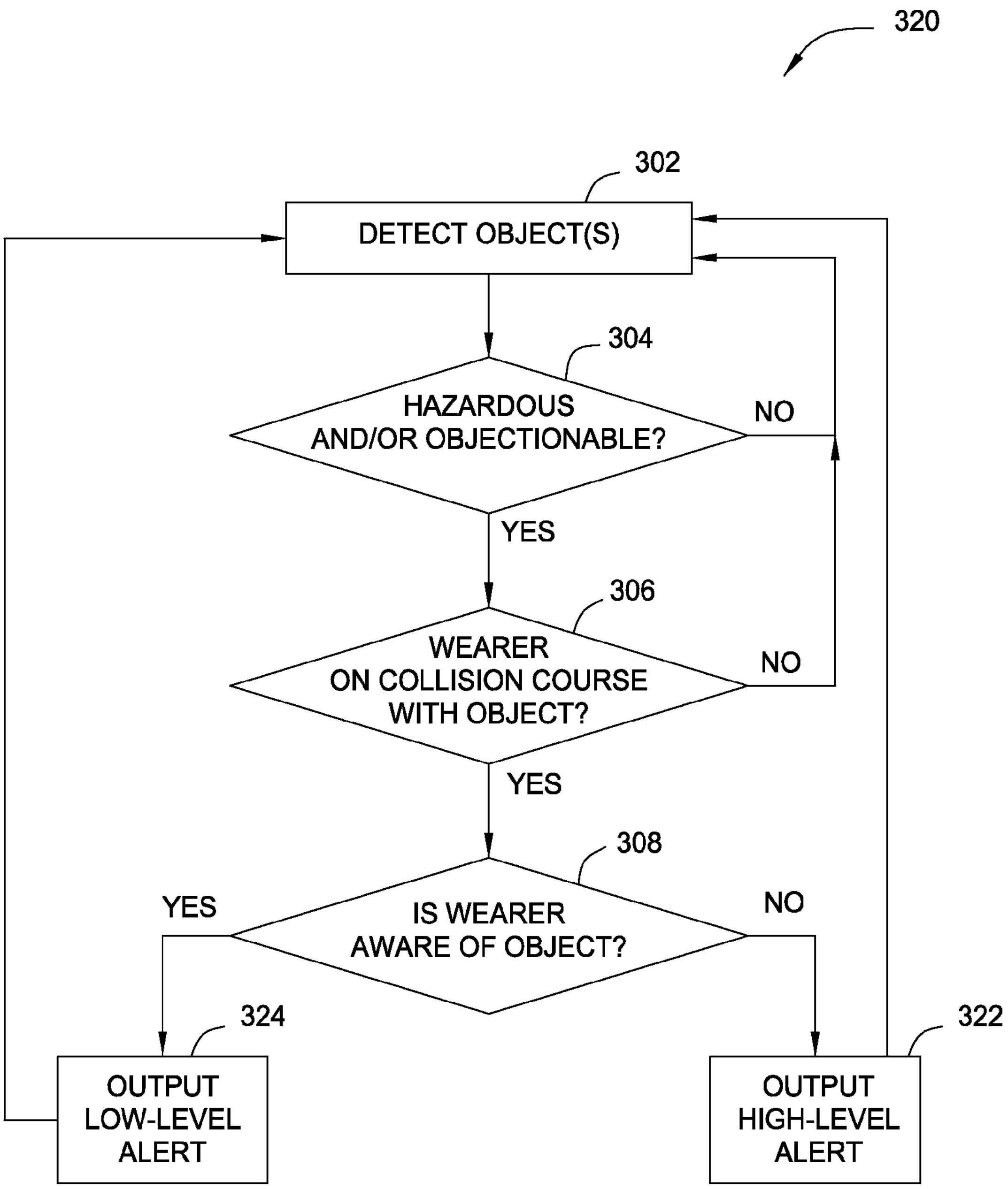
FIG. 3B is a flow chart for another process implemented by various embodiments.

FIG. 3B illustrates another embodiment of a process 320 that can be implemented by the processor 210. Block 302 (detecting an object and/or region), block 304 (determining whether the object and/or region is hazardous), block 306 (determining whether the pedestrian is on a collision course with the object and/or region), and block 308 (determining whether the pedestrian is aware of the object and/or region) can be the same as in the process 300 illustrated in FIG. 3A. In the process 320 of FIG. 3B, the processor 210 can output a low-level alert (block 324) if the processor 210 determines that the pedestrian is aware of the detected hazardous object and/or region. For example, a low-level alert can include a single, spoken-language message played through the acoustic transducer(s) 104 at a relatively low volume. If the processor 210 determines that the pedestrian is not aware of the detected hazardous object and/or region, then, in block 322, the processor 210 can output a high-level alert. For example, a high-level alert can include a repeated, spoken language message played through the acoustic transducer(s) 104 at a relatively high volume. The output high-level alert may also incorporate additional alert modes (e.g., visual and/or haptic).

Figure 4:
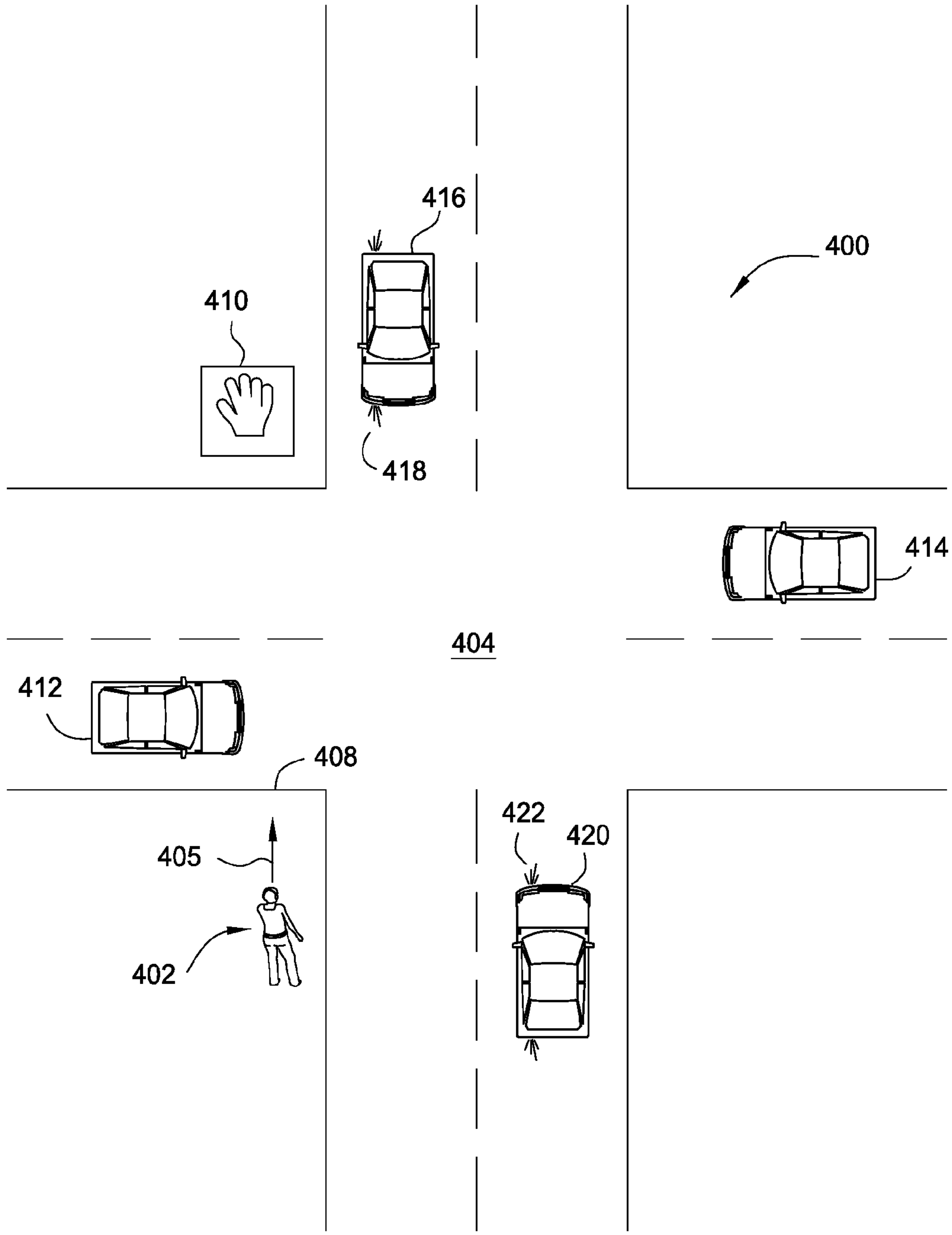
FIG. 4 is a top down view of a scenario that illustrates operation of various embodiments.

FIGS. 4, 5A, 5B, and 6 are exemplary scenarios that illustrate operation of the system 200. Referring to FIG. 4, in a first scenario 400, a pedestrian 402 is walking along a sidewalk toward an intersection 404 in the direction of arrow 405. Here, the system may detect the curb 408 (i.e., a boundary from a potentially dangerous road) and a do-not-walk signal 410 (indicating that the pedestrian does not have the right of way). The system 200 may also detect a car 412 about to cross the path of the pedestrian 402 in the near lane (i.e., a potentially hazardous object) as well as a car 414 that is heading toward the path of the pedestrian in the opposite lane (i.e., a potentially hazardous object). Furthermore, the system 200 may detect a turn signal 418 on a first car 418 that may turn in the path of the pedestrian (i.e., a potentially hazardous object) and detect a turn signal 422 on a second car 420 that may turn in the path of the pedestrian (i.e., a potentially hazardous object).

The system 200 may determine that the car 412 in the near lane will cross in front of the pedestrian 402 and therefore is not a threat. However, the system may determine that the remaining cars 414, 416, and 420 could each potentially collide with the pedestrian 402 if the pedestrian continues to walk past the curb 408 and into the road. For example, if the pedestrian 402 slows down as he approaches the curb 408 and/or looks around him as he approaches the curb 408 and/or makes eye contact with the "do not walk" pedestrian angel, then the system 200 can determine that those activities indicate that the pedestrian 402 is aware that the pedestrian signal 410 indicates "do not walk" and that the pedestrian 402 is aware of the cars 414, 416, and 420. As another example, the system 200 may detect brain signals or brain activity in regions of the brain that indicate that the pedestrian 402 is aware of the hazard. As another example, if the pedestrian 402 does not slow down or look around (e.g., because he is looking at the screen of his smart phone), then the system 200 can output issue alerts to the pedestrian 402. In various embodiments, the system 200 can issue a general alert for all of the cars (e.g., "warning—you are about to step into the street and there are several approaching cars!"). In various embodiments, the system 200 can issue separate alerts for each of the cars. The system 200 may prioritize the alerts based on a calculated likelihood of each threat. For example, if the car 414 approaching in the far lane is the most-likely to collide with the pedestrian 402 if the pedestrian 402 continues to walk into the street, then the system 200 may issue the alert for the car 414 first. In various embodiments, the alert for the car 414 can be output through an acoustic transducer 104 in the pedestrian's right ear to indicate a direction. The system 200 may then determine that the car 420 approaching from behind the pedestrian 402 is the next most-likely to collide with the pedestrian 402. Thus, the system 200 can issue the alert for the car 420 second. In various embodiments that include multiple acoustic transducers 104, the system 200 can output the alert such that the pedestrian 402 perceives the alert as coming from behind the pedestrian's right shoulder. Finally, the system 200 can issue the alert for the car 416. In various embodiments, the system 200 can output the alert such that the pedestrian 402 perceives the alert as coming from straight ahead and slightly to his right. An exemplary alert may be "warning—you are about to step into the street and there is a car approaching from your right [perceived as coming from the pedestrian's right], a car approaching from behind you [perceived as coming from the behind the pedestrian], and a car approaching in front of you [perceived as coming from in front of the pedestrian]."

Figures 5A, 5B, 5C, 5D, 5E:
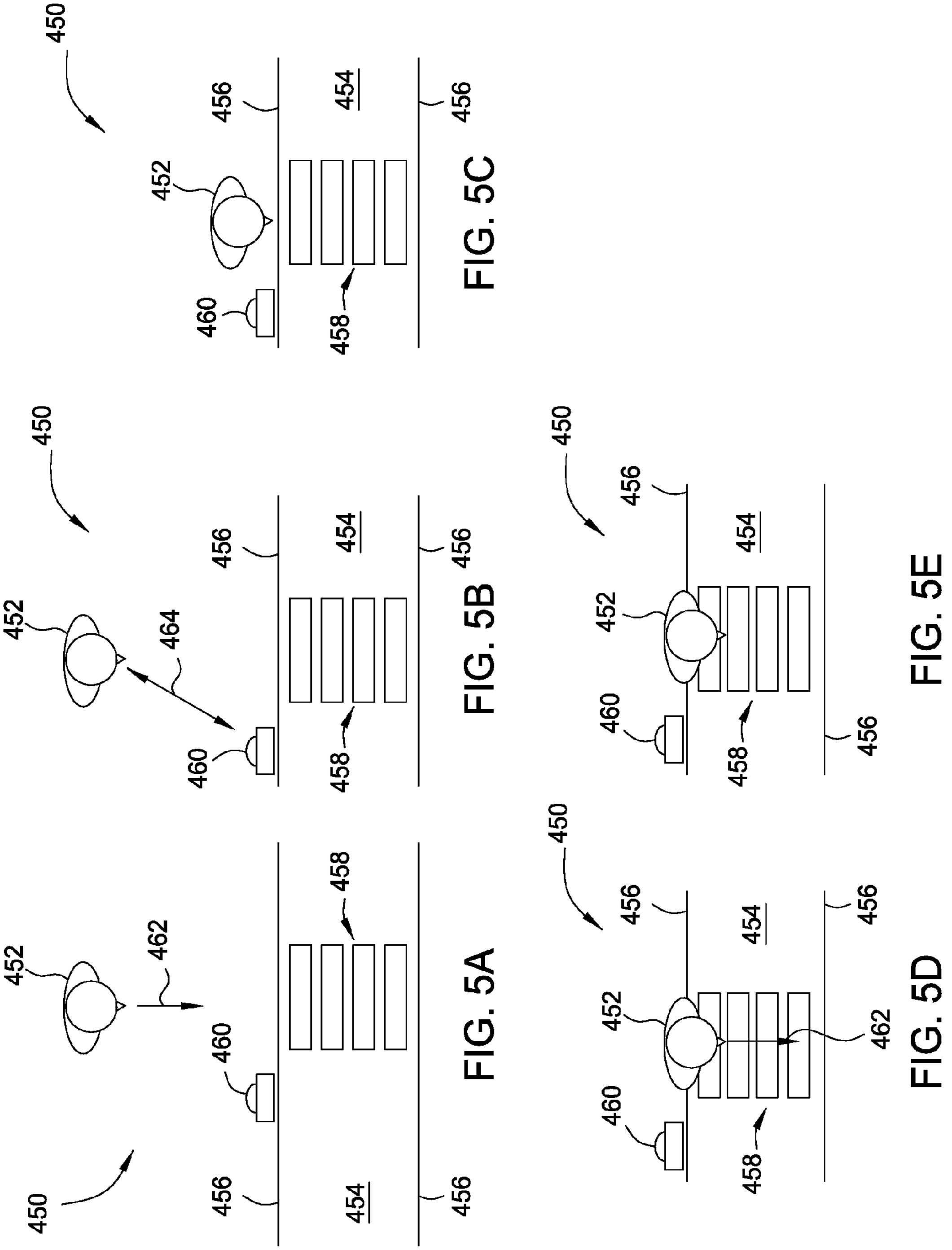
FIG. 5A-5E are a top down view of a scenario that illustrates operation of various embodiments.
Figures 5F, 5G, 5H, 5I, 5J, 5K:
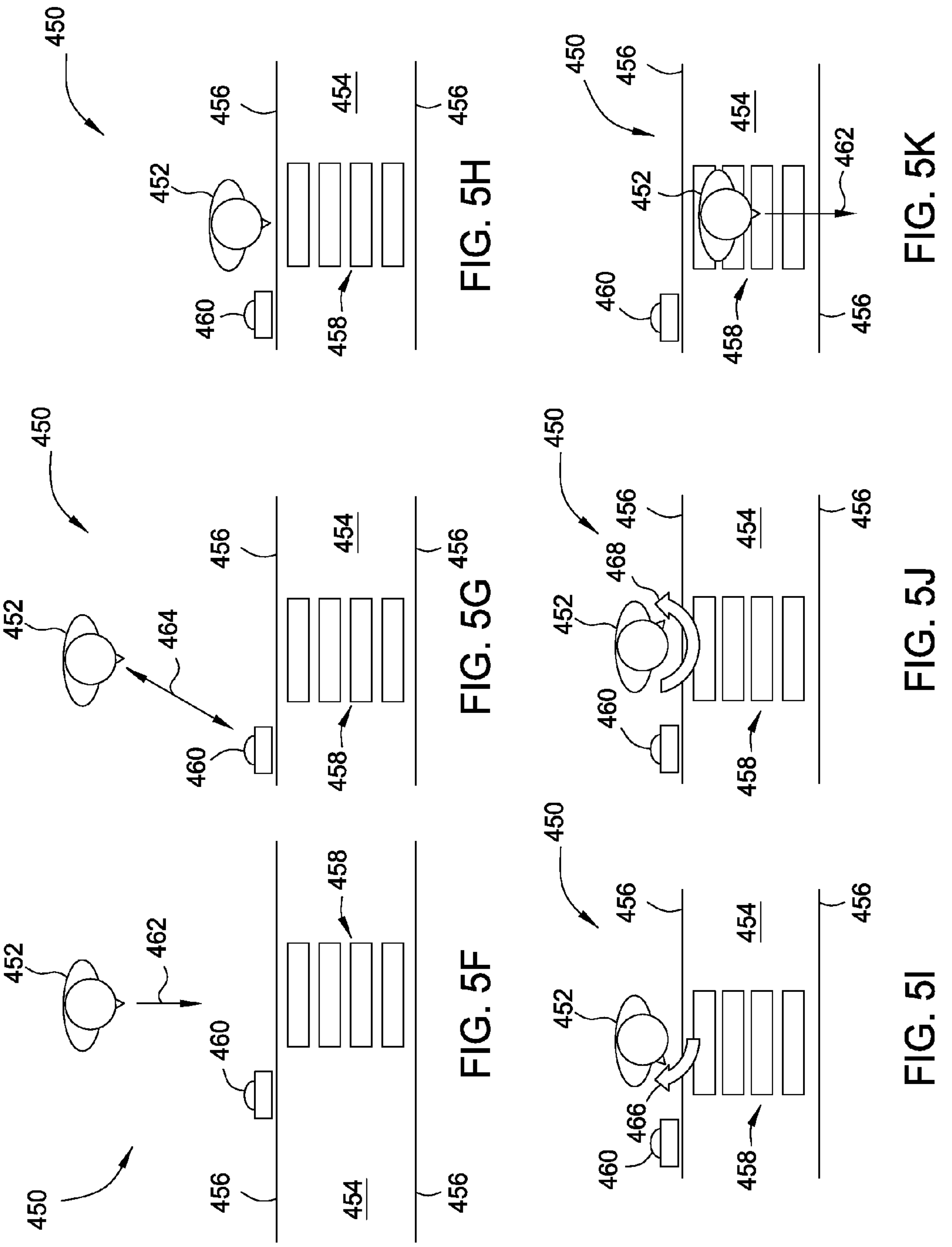
FIG. 5F-5K are a top down view of a scenario that illustrates operation of various embodiments.

FIGS. 5A-5K illustrate differences in operation of embodiments of the system in another scenario 450 based on different pedestrian 452 behaviors as the pedestrian 452 is walking toward a crosswalk 458 (direction of travel is indicated by arrow 462) between curbs 456 of a street 454 (as shown in FIGS. 5A and 5F). In the scenario 450, the crosswalk 458 is controlled by a walk/do-no-walk signal 460. As the pedestrian 452 approaches the crosswalk 458 and the signal 460, embodiments of the system 200 can detect the street 454, the crosswalk 458, the curbs 456, and the signal 460. In FIGS. 5B and 5G, the system 200 can detect that the signal 460 is indicating "do not walk." In various embodiments, the external camera(s) 220 can detect a color, symbol, and/or location of the signal 460 that may be illuminated to determine the state (i.e., "walk" or "do not walk") of the signal 460. In some instances, the system 200 may use the microphone(s) 222 to determine the state of the signal 460. For example, some signals 460 broadcast an audio message that provides the state of the signal 460 to blind pedestrians. The microphone(s) 222 can detect the audio broadcast and the processor 210 can analyze the detected audio broadcast to determine the state of the signal 460. In various embodiments, the system 200 can include a receiver (e.g., a radio signal receiver) that can detect broadcast messages from the signal 460 to determine the state of the signal 460. For example, the signal 460 may broadcast its current state (i.e., "walk" or "do not walk"), and the receiver of the system can receive the broadcast to determine the state of the signal 460. Since the state of the signal 460 in this scenario is "do not walk," the system 200 can determine that the upcoming crosswalk 458 is a hazardous region. Thus, in FIGS. 5C and 5H, as the pedestrian 452 approaches the curb 456, the system 200 analyzes activities of the pedestrian 452 to determine whether the pedestrian 452 is aware of the crosswalk 458 and the state of the signal 460. Referring to FIG. 5D, if the pedestrian 452 continues walking in the direction of arrow 462 and does not slow down, then the system 200 may determine that the pedestrian is not aware of the crosswalk 454 and/or is not aware that the state of the signal 460 is "do not walk." The system 200 can output a warning (e.g., "stop!") to the pedestrian 452 to try to prevent the pedestrian 452 from entering the crosswalk 458. The warning could be an audio warning and/or a visual warning (e.g., a picture of a stop sign displayed on the display screen of the pedestrians smart phone). As indicated by the absence of arrow 460 in FIG. 5E, the pedestrian 452 may stop in response to the warning. By contrast, referring now to FIGS. 5I and 5J, if the system 200 detects that the pedestrian 452 turns his head to the right (indicated by arrow 466 in FIG. 5I) and to the left (indicated by arrow 468 in FIG. 5J) as he approaches the curb 456, then the system 200 can determine that the pedestrian 452 is aware of the crosswalk 458 and is also aware that the state of the signal 460 is "do not walk." As a result, the system 200 may not output a warning even if the pedestrian continues into the crosswalk (as shown in FIG. 5K).

Figure 6:
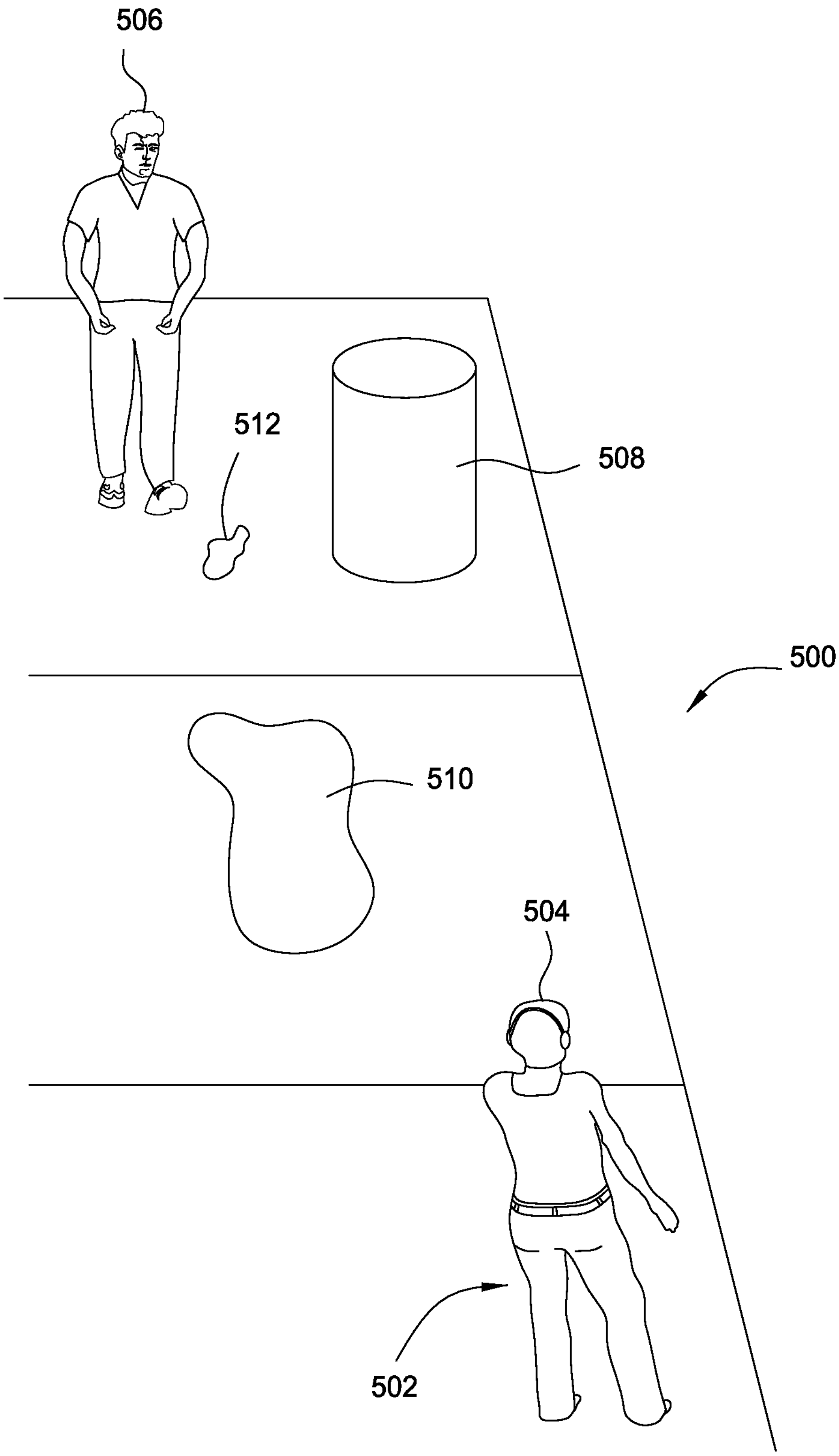
FIG. 6 is a perspective view of another scenario that illustrates operation of various embodiments.

FIG. 6 illustrates a third exemplary scenario 500 in which a pedestrian 502 is walking along a sidewalk and is wearing an embodiment of the system 200 incorporated in headphones 504. In this scenario, various objects and/or regions are in the pedestrian's path. The system can detect a puddle 510 (a region), a large municipal trash can 508 (an object), a gum wrapper 512 (an object), and another pedestrian 506 (an object) in front of the pedestrian 502. The system 200 may detect the puddle 510, trash can 508, gum wrapper 512, and other pedestrian 506 using the external camera(s) 220. In addition, the trash can 508 may be included in a geo-referenced hazard database stored in memory 212. The system 200 can compare the pedestrian's 502 position to the geo-referenced hazard database to identify the trashcan 508 in front of the pedestrian 502. The puddle may be detected as a region on the sidewalk having a different color, reflectivity, infrared signature, etc. than the surrounding pavement. A database in memory 212 may include visual characteristics of various objects and/or regions, such as puddles.

The system 200 can determine that the other pedestrian 506 and the large trash can 508 are hazardous to the pedestrian 502. Put differently, if the pedestrian 502 ran into the trash can 508 or the other pedestrian 506, the pedestrian 502 and/or the other pedestrian 506 may be injured. The system can determine that the gum wrapper 512 is very small and that the pedestrian 502 is not going to be injured if he steps on it. The puddle 510 may not be considered hazardous. However, if the pedestrian 502 has avoided puddles in the past, then the system 200 may employ machine learning to recognize that the pedestrian 502 does not want to walk through a puddle. Thus, the system 200 can identify the puddle 510 as a hazard.

The pedestrian's path may be heading toward the puddle 510, the gum wrapper 512, and the other pedestrian 506, passing to the side of the trash can 508. The system can therefore determine that the pedestrian is on a collision course with the puddle 510 and the other pedestrian 506. As discussed above, the gum wrapper 512 has been determined to not be a hazard, so the system 200 may not determine whether the pedestrian 502 is on a collision course with it. The system can then determine whether the pedestrian 502 is aware of the puddle 510 and the pedestrian 506. For example, if the pedestrian 502 is looking down at his smart phone but then looks up at the path in front of him, the system 200 can determine that the pedestrian is aware of the puddle 510 and the other pedestrian 506. Similarly, if the pedestrian 502 adjusts his path to avoid the puddle 510 and the pedestrian 506, then the system 200 can determine that the pedestrian 502 is aware of the puddle 510 and the other pedestrian 506. However, if the pedestrian 502 continues on the path toward the puddle 510 and the other pedestrian 506 and/or does not look up from his smart phone, then the system 200 can determine that the pedestrian 502 is not aware of the puddle 510 and the other pedestrian 506. The system can then issue alerts via acoustic transducer(s) 104 in the headphones 504. The system 200 can also issue a visual alert on the display screen of the pedestrian's 502 smart phone.

In various embodiments, the system 200 may be able to provide an external signal to alert others (e.g., other pedestrians and vehicle operators) that the pedestrian is not paying attention to his path of travel. For example, the housing 104 shown in FIG. 1A may include one or more lights (e.g., light emitting diodes) that flash if the pedestrian is not aware of an imminent collision with a hazardous object and/or region. As another example, the pedestrian can be wearing a sign that can display messages. For example, if the pedestrian is about to enter a cross walk and is not paying attention, the sign can illuminate with a message saying "crossing the street" to alert vehicle operators of the pedestrian's actions. As another example, the system 200 may wirelessly transmit signals to nearby vehicles such that the vehicles can display a message to vehicle operators that the pedestrian is not paying attention to where he is going. For example, the vehicle may display the message on a moving map display in the vehicle. If the system 200 is equipped with a GPS module that tracks the pedestrian's location, then the wireless signal sent to vehicles can include a location of the pedestrian such that the vehicle map display can show the location of the pedestrian on the map in the vehicle.

The various embodiments described above can provide one or more sensors and computer processing to recognize hazardous objects and/or regions in a pedestrian's path. The sensors and computer processing can further determine whether the pedestrian is paying attention to his surrounding and is likely to be aware of the detected hazardous objects and/or regions. If the pedestrian likely is not paying attention, then the computer processing can output an alert and/or warning to the pedestrian to alert him to the hazardous object and/or region. By sending such alerts and/or warnings, embodiments described herein can act as a guardian angel, protecting the pedestrian from inadvertently walking into a hazardous object and/or region when he is distracted and not paying attention to his surroundings.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, various embodiments of the system may access a geo-referenced hazard database that is stored in the cloud. In various embodiments, a cloud computing environment can receive reported location and trajectory information for various pedestrians and vehicles to calculate likelihoods of collisions. The cloud computing environment can report likely collisions to involved pedestrians and/or vehicles.

While the foregoing is directed to embodiments of the present invention, other and further embodiments of the invention may be devised without departing from the basic scope thereof, and the scope thereof is determined by the claims that follow.

What is claimed is:

1. A system for providing warnings of hazards to a user, comprising:

a first sensor that detects at least one of a region and an object in an environment of the user;

a second sensor that detects an activity of the user, wherein the first sensor and the second sensor are configured to be worn by the user;

at least one acoustic transducer configured to be worn proximate to an ear of the user;

a memory storing instructions; and a processor coupled to the memory, wherein, when executed by the processor, the instructions configure the processor to:

identify a hazard based on at least one of the region and the object detected by the first sensor;

determine whether the activity of the user detected by the second sensor indicates awareness by the user of the hazard; and upon determining that the activity of the user does not indicate awareness of the hazard, output to the at least one acoustic transducer an audio warning for the hazard.

2. The system of claim 1, wherein the first sensor comprises an image sensor that detects objects in the environment of the user.

3. The system of claim 1, wherein the second sensor comprises an image sensor that detects an eye gaze direction of the user.

4. The system of claim 3, wherein the processor is further configured to determine a bearing to the at least one of the detected region and the detected object, and wherein the processor is configured to determine whether the activity of the user detected by the second sensor indicates awareness by the user of the hazard by determining whether the eye gaze direction of the user corresponds to direction of the bearing to the at least one of the detected region and the detected object.

5. The system of claim 1, wherein the second sensor comprises at least one attitude sensor that detects at least one of motion and position of the head of the user.

6. The system of claim 5, wherein the indication of awareness comprises detecting at least one of motion and position of the head of the user toward the identified hazard.

7. Headphones for providing warnings of hazards to a user, comprising:

a housing;

at least one acoustic transducer arranged on the housing and configured to be positioned proximate to at least one ear of the user when the user wears the headphones;

a first sensor that detects at least one of a region and an object in an environment of the user;

a second sensor configured to detect an activity of the user, wherein the first sensor and the second sensor are arranged relative to the housing;

a memory storing instructions; and a processor coupled to the memory, wherein, when executed by the processor, the instructions configure the processor to:

identify a hazard based on at least one of the region and the object detected by the first sensor;

determine whether the activity of the user detected by the second sensor indicates awareness by the user of the hazard; and upon determining that the activity of the user does not indicate awareness of the hazard, output to the at least one acoustic transducer an audio warning for the hazard.

8. The headphones of claim 7, wherein the second sensor calculates at least one of a location of the user and a speed of travel of the user.

9. The headphones of claim 8, wherein the indication of awareness comprises a detected change in speed of travel of the user.

10. The headphones of claim 7, wherein the second sensor detects brain activity of the user.

11. The headphones of claim 10, wherein the processor determines whether the activity of the user detected by the second sensor indicates awareness by the user of the hazard by detecting a change in the brain activity of the user.

12. The headphones of claim 7, wherein the first sensor comprises an image sensor that captures successive images of at least one object in the environment of the user, wherein, upon detecting an object, the processor is further configured to calculate a relative trajectory between the object and the image sensor, and upon determining that the relative trajectory is a collision trajectory, identifying the object as a hazard.

13. The headphones of claim 7, wherein the at least one acoustic transducer comprises a first acoustic transducer configured to be positioned proximate to the right ear of the user and a second acoustic transducer configured to be positioned proximate to the left ear of the user when the user wears the headphones, and wherein the processor is further configured to:

determine a bearing to the at least one of the detected region and the detected object; and output the warning to the first acoustic transducer and the second acoustic transducer in a manner that the warning is played in an apparent location aligned with the determined bearing.

14. The system of claim 1, wherein the processor is further configured to:

determine, via a machine learning algorithm, that the user moved to avoid at least one of a first object and a first region;

in response, identify the at least one of the first object and the first region as a hazard; and upon determining that at least one of the first object and the first region is present in a digital image acquired via the first sensor, identify at least one of the first object and the first region as a hazard.

* * * * *